US011025931B2

(12) United States Patent
Samuelsson et al.

(10) Patent No.: US 11,025,931 B2
(45) Date of Patent: *Jun. 1, 2021

(54) METHODS, ENCODER, AND TRANSCODER FOR TRANSCODING

(71) Applicant: Telefonaktiebolaget LM Ericsson (publ), Stockholm (SE)

(72) Inventors: Jonatan Samuelsson, Enskede (SE); Rickard Sjöberg, Stockholm (SE); Thomas Rusert, Kista (SE); Kenneth Andersson, Gävle (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,573

(22) Filed: Jan. 16, 2020

(65) Prior Publication Data
US 2020/0154122 A1 May 14, 2020

Related U.S. Application Data

(63) Continuation of application No. 16/067,463, filed as application No. PCT/SE2016/050290 on Apr. 6, 2016, now Pat. No. 10,582,206.

(51) Int. Cl.
*H04N 19/40* (2014.01)
*H04N 19/46* (2014.01)
(Continued)

(52) U.S. Cl.
CPC ......... *H04N 19/40* (2014.11); *H04N 19/105* (2014.11); *H04N 19/18* (2014.11); *H04N 19/46* (2014.11);
(Continued)

(58) Field of Classification Search
CPC ...... H04N 19/40; H04N 19/105; H04N 19/18; H04N 19/46; H04N 19/48; H04N 21/2343
(Continued)

(56) References Cited

U.S. PATENT DOCUMENTS 8,073,052 B1 12/2011 Xu et al.
9,930,351 B2 3/2018 Andersson et al.
(Continued)

FOREIGN PATENT DOCUMENTS

WO 2007115133 A2 10/2007
WO 2015053673 A1 4/2015
WO 2015053697 A1 4/2015

OTHER PUBLICATIONS

Andersson, Kenneth et al., "Guided transcoding using auxiliary pictures," Joint Collaborative Team on Video Coding (JCT-VC) of ITU-T SG 16 WP 3 and ISO-IEC JTC 1/SC 29/WG 11, Document: JCTVC-P0065, Jan. 9-17, 2014, 5 pages, San Jose, USA.
(Continued)

*Primary Examiner* — Dominic D Saltarelli
(74) *Attorney, Agent, or Firm* — Withrow & Terranova, PLLC

(57) ABSTRACT

The present invention relates to an encoder, transcoder and methods thereof. A transcoder embodiment involves transcoding a bitstream representing an original video source from an input video format to an output video format. An encoder embodiment involves providing transform coefficients in side information related to an encoded video bitstream.

16 Claims, 11 Drawing Sheets

(51) Int. Cl.
*H04N 19/48* (2014.01)
*H04N 19/105* (2014.01)
*H04N 19/18* (2014.01)
*H04N 21/2343* (2011.01)

(52) U.S. Cl.
CPC ......... *H04N 19/48* (2014.11); *H04N 21/2343* (2013.01)

(58) Field of Classification Search
USPC .................................................... 375/240.02
See application file for complete search history.

(56) References Cited

U.S. PATENT DOCUMENTS

| | | | |
|---|---|---|---|
| 10,582,206 B2 | 3/2020 | Samuelsson et al. | |
| 2005/0041738 A1* | 2/2005 | Lin ..................... | H04N 19/184 375/240.03 |
| 2007/0230568 A1 | 10/2007 | Eleftheriadis et al. | |
| 2007/0237236 A1 | 10/2007 | Chang et al. | |
| 2012/0294353 A1* | 11/2012 | Fu ....................... | H04N 19/176 375/240.02 |
| 2015/0085923 A1 | 3/2015 | Rane et al. | |
| 2015/0215631 A1* | 7/2015 | Zhou ................... | H04N 19/436 375/240.02 |
| 2017/0302966 A1* | 10/2017 | Xu ....................... | H04N 19/182 |
| 2017/0347138 A1 | 11/2017 | Saxena et al. | |
| 2019/0014334 A1 | 1/2019 | Samuelsson et al. | |

OTHER PUBLICATIONS

Andersson, Kenneth R. et al., "Transcoder-friendly scalable coding," Joint Collaborative Team on Video Coding (JCT-VC) of ITU-T SG 16 WP 3 and ISO/IEC JTC 1/SC 29/WG 11, Document: JCTVC-O0127, Oct. 23-Nov. 1, 2013, 12 pages, Geneva, Switzerland.

De Cock, J. et al., "Architectures for Fast Transcoding of H.264/AVC to Quality-Scalable SVC Streams," IEEE Transactions on Multimedia, vol. 11, No. 7, Nov. 2009, pp. 1209-1224.

Rusert, Thomas et al., "Guided Just-In-Time Transcoding for Cloud-Based Video Platforms," 2016 IEEE International Conference on Image Processing (ICIP), Phoenix, AZ, 2016, pp. 1489-1493.

Sun, Xiaoyan et al., "The framework for seamless switching of scalable bitstreams," International Organisation for Standardisation, ISO/IEC JTC1/SC29/WG11, Coding of Moving Pictures and Audio, MPEG2002/8214, Mar. 2002, 8 pages, Jeju Island.

Zheng, Feiyang et al., "Fast H.264/AVC to HEVC Transcoding Based on Residual Homogeneity," 2014 International Conference on Audio, Language and Image Processing (ICALIP2014), Shanghai, 2014, pp. 765-770.

Non-Final Office Action for U.S. Appl. No. 16/067,463, dated Jul. 17, 2019, 6 pages.

Notice of Allowance for U.S. Appl. No. 16/067,463, dated Oct. 21, 2019, 7 pages.

Extended European Search Report for European Patent Application No. 16898075.3, dated Aug. 2, 2019, 12 pages.

International Search Report and Written Opinion for International Patent Application No. PCT/SE2016/050290, dated Jan. 23, 2017, 13 pages.

\* cited by examiner

METHODS, ENCODER, AND TRANSCODER FOR TRANSCODING

RELATED APPLICATIONS

This application is a continuation of U.S. patent application Ser. No. 16/067,463, filed Jun. 29, 2018, which is a 35 U.S.C. § 371 national phase filing of International Application No. PCT/SE2016/050290, filed Apr. 6, 2016, the disclosures of which are incorporated herein by reference in their entireties.

TECHNICAL FIELD

The proposed technology generally relates to methods, encoder and transcoder for transcoding a bitstream representing an original video source from an input format to an output format.

BACKGROUND

When video media is transmitted in a fixed or wireless communication system it is typically adapted or transcoded at some intermediate node between a source and a sink. The source may be exemplified by a media provider and the sink may be exemplified by a viewing device such as a mobile device. During the adaptation the video media is typically compressed which necessitates a number of bitrates to select from at the source node. An optimal bitrate would take both the network capabilities and the sink capabilities into consideration in order to utilize both the uplink and the downlink most efficiently. Thereby at time of encoding the video at the source, the source node is unaware of the end user capabilities and the network capabilities, and thus the intermediate node needs to adapt the video in order to provide it to the sink at a desired or necessary format. This requires a high quality from the source and a high level of computational complexity on the adaptation or transcoding node in order to optimize the use of downlink capabilities. The source needs to have high quality since it may need to be re-encoded at the transcoder to fit the downlink bandwidth or the capabilities of the receiving side. WO2015/053697 describes a solution where additional side information is transmitted to the transcoder from the encoder to assist the transcoding process.

SUMMARY

There is a need for an improved solution for encoding and transcoding of video media in order to achieve increased compression.

That is achieved according to a first aspect by a method for a transcoder for transcoding a bitstream representing an original video source from an input video format to an output video format. The method comprises receiving the bitstream with the input video format, wherein the input video format is a first video format; and receiving side information related to said video bitstream. Said side information comprising at least:
  a video bitstream representing the original video source with a second video format, coding parameters based on knowledge of the original video source;
  transform coefficients, indicative of a residual between original transform coefficients and estimated transform coefficients;
The method further comprises decoding said received side information to generate transcoding guiding information, estimating a representation of said received bitstream and transform coefficients with a second video format based on the received bit stream with first video format and the generated transcoding guiding information, determining a first set of transform coefficients from the estimated transform coefficients wherein the first set of the transform coefficients captures the main characteristics of the original transform coefficients, determining a second set of transform coefficients from the side information wherein the transform coefficients of the second set corresponds to same positioning within a transform block as the transform coefficients of the first set, adding the second set of transform coefficients to the first set of the transform coefficients, to create refined transform coefficients that better captures the characteristics of the original transform coefficients than the estimated transform coefficients, and encoding the estimated representation of said received bitstream with the second video format using the created refined transform coefficients.

According to a further aspect a method for an encoder for providing transform coefficients in side information related to an encoded video bitstream is provided. The method comprises obtaining original transform coefficients from the encoded video bitstream, where the encoded video bitstream represents an original video source with a second video format, obtaining a second encoded video bitstream, where the second encoded video bitstream represents an original video source with at least another format than the second video format, using the encoded video bitstream and the second encoded video bitstream to estimate transform coefficients. The method further comprises determining a first set of transform coefficients, wherein the first set of transform coefficients captures the main characteristics of the original transform coefficients, determining a second set of transform coefficients from the second encoded video bitstream that corresponds to the same positioning within the transform as the transform coefficients of the first set of transform coefficients, determining side information comprising obtained transform coefficients that are obtained by taking the difference between the second set of transform coefficients and the first set of transform coefficients; and encoding and sending the side information comprising the obtained transform coefficients.

According to a further aspect a transcoder for transcoding a bitstream representing an original video source from an input video format to an output video format is provided. The transcoder is configured to:
receive the bitstream with the input video format, wherein the input video format is a first video format;
receive side information related to said video bitstream. Said side information comprising at least: a video bitstream representing the original video source with a second video format, coding parameters based on knowledge of the original video source; transform coefficients, indicative of a residual between original transform coefficients and estimated transform coefficients. The transcoder is further configured to decode said received side information to generate transcoding guiding information, estimate a representation of said received bitstream and transform coefficients with a second video format based on the received bit stream with first video format and the generated transcoding guiding information, determine a first set of transform coefficients from the estimated transform coefficients wherein the first set of the transform coefficients captures the main characteristics of the original transform coefficients, determine a second set of transform coefficients from the side information wherein the transform coefficients of the second set corresponds to same positioning within a transform block as the transform coefficients of the first set, add the second set of transform coefficients to the first set of the transform coefficients, to create refined transform coefficients (706) that better captures the characteristics of the original transform coefficients than the estimated transform coefficients, and encode the estimated representation of said received bitstream with the second video format using the created refined transform coefficients.

According to a further aspect an encoder for providing transform coefficients in side information related to an encoded video bitstream is provided. The encoder is configured to: obtain original transform coefficients from the encoded video bitstream, where the encoded video bitstream represents an original video source with a second video format, obtain a second encoded video bitstream, where the second encoded video bitstream represents an original video source with at least another format than the second video format. The encoder is further configured to use the encoded video bitstream and the second encoded video bitstream to estimate transform coefficients, determine a first set of transform coefficients, wherein the first set of transform coefficients captures the main characteristics of the original transform coefficients. The encoder is further configured to determine a second set of transform coefficients from the second encoded video bitstream that corresponds to the same positioning within the transform as the transform coefficients of the first set of transform coefficients, determine side information comprising obtained transform coefficients that are obtained by taking the difference between the second set of transform coefficients and the first set of transform coefficients, encode and send the side information comprising the obtained transform coefficients.

According to a further aspect a transcoder for transcoding a bitstream representing an original video source from an input video format to an output video format is provided. The transcoder comprises a receiver 910 for receiving the bitstream with the input video format, wherein the input video format is a first video format and for receiving side information related to said video bitstream. Said side information comprising at least:
- a video bitstream representing the original video source with a second video format, coding parameters based on knowledge of the original video source; and
- transform coefficients, indicative of a residual between original transform coefficients and estimated transform coefficients.

The transcoder further comprises a decoder for decoding said received side information to generate transcoding guiding information, an estimator for estimating a representation of said received bitstream and transform coefficients with a second video format based on the received bit stream with first video format and the generated transcoding guiding information, a determining unit for determining a first set of transform coefficients from the estimated transform coefficients wherein the first set of the transform coefficients captures the main characteristics of the original transform coefficients and for determining a second set of transform coefficients from the side information wherein the transform coefficients of the second set correspond to same positioning within a transform block as the transform coefficients of the first set, an adder for adding the second set of transform coefficients, to the first set of the transform coefficients, to create refined transform coefficients that better captures the characteristics of the original transform coefficients than the estimated transform coefficients, and an encoder for encoding the estimated representation of said received bitstream with the second video format using the created refined transform coefficients.

According to a further aspect an encoder for providing transform coefficients in side information related to an encoded video bitstream is provided. The encoder comprises an obtaining unit for obtaining original transform coefficients from the encoded video bitstream, where the encoded video bitstream represents an original video source with a second video format, and for obtaining a second encoded video bitstream, where the second encoded video bitstream represents an original video source with at least another format than the second video format. The encoder further comprises an estimator for using the encoded video bitstream and the second encoded video bitstream to estimate transform coefficients and a determining unit for determining a first set of transform coefficients, wherein the first set of transform coefficients captures the main characteristics of the original transform coefficients, for determining a second set of transform coefficients from the second encoded video bitstream that corresponds to the same positioning within the transform as the transform coefficients of the first set of transform coefficients, and for determine side information comprising obtained transform coefficients that are obtained by taking the difference between the second set of transform coefficients and the first set of transform coefficients. The encoder further comprises an encoding unit for encoding and a sender for sending the side information comprising the obtained transform coefficients.

According to a further aspect an encoder for providing transform coefficients in side information related to an encoded video bitstream is provided. The encoder comprises: a processor; and a memory comprising instructions executable by said processor, wherein said processor is operative to
- Obtain original transform coefficients from the encoded video bitstream, where the encoded video bitstream represents an original video source with a second video format,
- Obtain a second encoded video bitstream, where the second encoded video bitstream represents an original video source with at least another format than the second video format
- Use the encoded video bitstream and the second encoded video bitstream to estimate transform coefficients,
- Determine a first set of transform coefficients, wherein the first set of transform coefficients captures the main characteristics of the original transform coefficients,
- Determine a second set of transform coefficients from the second encoded video bitstream that corresponds to the same positioning within the transform as the transform coefficients of the first set of transform coefficients,
- Determine side information comprising obtained transform coefficients that are obtained by taking the difference between the second set of transform coefficients and the first set of transform coefficients;
- Encode and send the side information comprising the obtained transform coefficients.

According to a further aspect, a transcoder for transcoding a bitstream representing an original video source from an input video format to an output video format is provided. The transcoder comprises:
a processor; and a memory comprising instructions executable by said processor. Said processor is operative to
- receive the bitstream with the input video format, wherein the input video format is a first video format;

receive side information related to said video bitstream, said side information comprising at least:
  a video bitstream representing the original video source with a second video format, coding parameters based on knowledge of the original video source;
  transform coefficients, indicative of a residual between original transform coefficients and estimated transform coefficients;
decode said received side information to generate transcoding guiding information,
estimate a representation of said bitstream and transform coefficients with a second video format based on the received bit stream with first video format and the generated transcoding guiding information,
determine a first set of transform coefficients from the estimated transform coefficients wherein the first set of the transform coefficients captures the main characteristics of the original transform coefficients
determine a second set of transform coefficients from the side information wherein the transform coefficients of the second set corresponds to same positioning within a transform block as the transform coefficients of the first set,
add the second set of transform coefficients to the first set of the transform coefficients, to create refined transform coefficients that better captures the characteristics of the original transform coefficients than the estimated transform coefficients, and
encode the estimated representation of said received bitstream with the second video format using the created refined transform coefficients.

According to a further aspect a computer program is also provided. The computer program comprises instructions, which when executed by a processor, cause said processor to:
  receive the bitstream with the input video format, wherein the input video format is a first video format;
  receive side information related to said video bitstream, said side information comprising at least:
  a video bitstream representing the original video source with a second video format, coding parameters based on knowledge of the original video source;
  transform coefficients, indicative of a residual between original transform coefficients and estimated transform coefficients;
decode said received side information to generate transcoding guiding information,
estimate a representation of said bitstream and transform coefficients with a second video format based on the received bit stream with first video format and the generated transcoding guiding information,
determine a first set of transform coefficients from the estimated transform coefficients wherein the first set of the transform coefficients captures the main characteristics of the original transform coefficients
determine a second set of transform coefficients from the side information wherein the transform coefficients of the second set corresponds to same positioning within a transform block as the transform coefficients of the first set,
add the second set of transform coefficients to the first set of the transform coefficients, to create refined transform coefficients that better captures the characteristics of the original transform coefficients than the estimated transform coefficients, and
encode the estimated representation of said received bitstream with the second video format using the created refined transform coefficients.

According to a yet further aspect, a further computer program is provided. The computer program comprises instructions, which when executed by a processor, cause said processor to:
  Obtain original transform coefficients from the encoded video bitstream, where the encoded video bitstream represents an original video source with a second video format,
  Obtain a second encoded video bitstream, where the second encoded video bitstream represents an original video source with at least another format than the second video format
  Use the encoded video bitstream and the second encoded video bitstream to estimate transform coefficients,
  Determine a first set of transform coefficients, wherein the first set of transform coefficients captures the main characteristics of the original transform coefficients,
  Determine a second set of transform coefficients from the second encoded video bitstream that corresponds to the same positioning within the transform as the transform coefficients of the first set of transform coefficients,
  Determine side information comprising obtained transform coefficients that are obtained by taking the difference between the second set of transform coefficients and the first set of transform coefficients;
  Encode and send the side information comprising the obtained transform coefficients.

An advantage with the embodiments is that is possible to make better prediction of the original transform coefficients and side information with less overhead can be produced.

DETAILED DESCRIPTION

Figure 1:
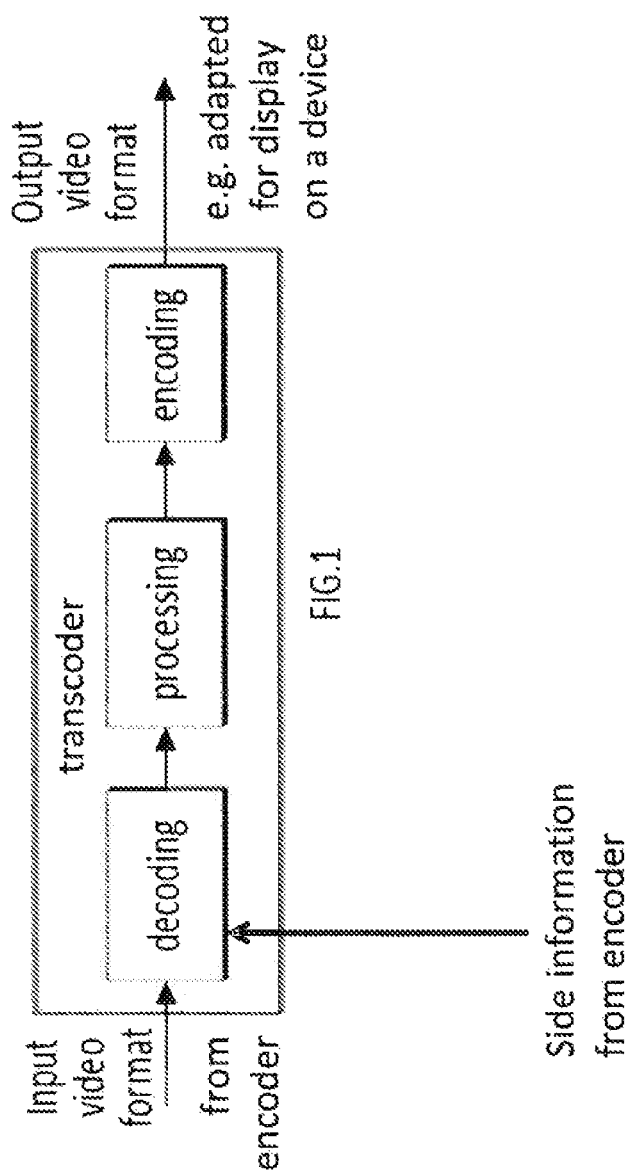
FIG. 1 illustrates schematically a transcoder that is transcoding a bitstream representing an original video source from an input video format to an output video format by using side information from the encoder.

As used herein, the term transcoder may refer to a transcoding or adaptation device which may be located in a network node. An example of a network node is a server that has connections with both the video media (YouTube, Netflix) and the end-users (mobile devices, PCs, TVs). A transcoder typically consist a video decoder and a video encoder. The video is decoded to pixel values and then re-encoded to another format/bitrate.

The proposed technology is best understood in the context of a system wherein a source node, such as a video provider, provides both an encoded video bitstream as input video signal and side information to an intermediate node, such as a transcoding or adaptation node, which in turn provides an encoded video bitstream as an output video signal. The output video signal can subsequently be received and displayed at a sink node, such as a user equipment or the like.

For a better understanding of the proposed technology, it may be useful to begin with a brief overview of current adaptation and transcoding methods and their benefits.

Typically in video coding, encoding parameters such as coding algorithms to use (e.g. video coding standard and profile to use), video resolution, frame rate, quality, bit rate, etc., need to be decided at the time of encoding. The optimal encoding parameters depend on the capabilities of the receiving device (computational capabilities and memory) as well as the capacity of the network links involved e.g. available bandwidth. These parameters may in many scenarios not be known at the encoding time, e.g. when the network characteristics vary over time or over location of the receiver, or when the video is sent to more than one receiving device, each receiving device having different capabilities or different associated network access characteristics. In such cases, in order to optimally cope with available network resources, device characteristics and user experience when consuming the content, it is required to adapt the compressed video signal during the transmission in the network, as depicted by "processing" in FIG. 1.

The network link from the sender (encoder) to the transcoder is denoted as "uplink". The network link from the transcoder to the receiver (e.g. decoder of the end user device) is denoted as "downlink". Both uplink and downlink bandwidths are typically scarce resources. In the case both sender and receiver are end-user devices (e.g. smartphone or laptop) connected to fixed or mobile networks, the uplink is typically a bottleneck, since uplink bandwidth is typically lower than downlink bandwidth (e.g. in ADSL networks or cellular networks). In the case the sender is a video server such as streaming server, or video on demand server, or video cache) and the receiver is an end user-device (e.g. smartphone, tablet or TV, the downlink bandwidth is often a bottleneck which determines the video quality that can be delivered to the user (e.g. in the case when the end-user is connected via DSL or cellular access). Furthermore, the uplink may also be an expensive resource, e.g. in case many different content needs to be delivered from the sender (e.g. video on demand server) to end users in this case the uplink could be a content distribution network, CDN.

Besides network capacity, other scarce resources include computational and memory capabilities in the sender and receiver, and in particular in the transcoder.

The problem to be solved is to provide a scheme for video encoding/transcoding/decoding to optimize network utilization by minimizing uplink and downlink bit rates, while at the same time minimizing the computational/memory complexity in the encoder, transcoder, and decoder.

Video coding methods, such as H.264/AVC and H.265/HEVC, are typically based on the so-called hybrid video coding scheme.

In the hybrid video coding scheme, an encoder typically performs the following basic steps, applied to every picture in the video sequence, on a per-block basis:

1. A prediction operation is performed comprising: predicting the original video signal (e.g. pixel data) based on previously encoded and reconstructed pixel data, and computing the difference between the original video signal and the prediction. This difference is called "residual data" or "residual signal" or "residual". The prediction operation for a certain block can be based on pixels in the same picture as the currently encoded block, then called "intra prediction", or based on pixels in previously encoded pictures, then called "inter prediction". The source data used for the prediction is called "prediction reference". In order to improve inter prediction effectiveness; a so-called motion compensation operation is typically applied, which is based on motion vectors that indicate the displacement of the currently encoded block relative to the reference picture.

In order to achieve high compression efficiency, the encoder needs to try many different encoding parameters for each block such as coding modes, block partitionings, motion vectors, etc., a process that is sometimes referred to as mode/motion estimation and/or rate-distortion optimization (RDO). The process could be interpreted as a further step that precedes the prediction step.
2. A spatial transform operation is performed to transform the prediction residual signal into a frequency domain.
3. The resulting transform coefficients are quantized and entropy-encoded e.g. using context-adaptive binary arithmetic coding, CABAC. Further data such as indication of block partitioning, prediction mode (inter/intra), motion vectors, etc., is entropy encoded as well. The output of the entropy encoding stage is referred to as the "bitstream".
4. The encoder performs parts of the decoding process (see below) in order to generate reference information to be used for encoding subsequently blocks.

In the following, the application of inter and intra prediction operations and the generation of the residual data in the encoder (step 1 above) will be referred to as "motion-compensated residual generation".

The decoder typically performs the following basic steps, applied to every picture in the video sequence, on a per-block basis:

1. Entropy decoding quantized transform coefficients and other data to control the decoding/pixel reconstruction process.
2. Performing inverse transform of the decoded quantized transform coefficients to obtain the reconstructed prediction residual.
3. Performing prediction operations depending on the prediction mode and motion information signaled in the bitstream (inter/intra mode, motion vectors etc.), and adding the reconstructed prediction residual to the prediction, obtaining the intermediate reconstructed pixel data.
4. Performing filtering operations (e.g. de-blocking, sample-adaptive offset, SAO), depending on the intermediate reconstructed pixel data, generating the final reconstructed pixel data.

In the following, the application of inter and intra prediction operations and the generation of the intermediate and final reconstructed pixel data in the decoder will be referred to as "motion-compensated reconstruction".

Encoding is typically significantly more demanding than decoding in terms of computational complexity. The reason for that is that in order to achieve high compression efficiency, the encoder needs to try many different encoding parameters for each block such as coding modes, block partitioning, motion vectors, etc. The encoder is typically not standardized, so that encoders may choose to try few different encoder parameters; however, that will come at the cost of reduced compression efficiency.

In the embodiments of the present invention, the transcoding is performed based on both a received video bitstream and received side information. The side information can be utilized to guide the transcoding process in order to reduce the computational complexity of the transcoding process and to optimize both the downlink and uplink resources.

An object with the embodiments of the present invention is to achieve an improved solution for encoding and transcoding of video media in order to achieve increased compression.

Figure 2:
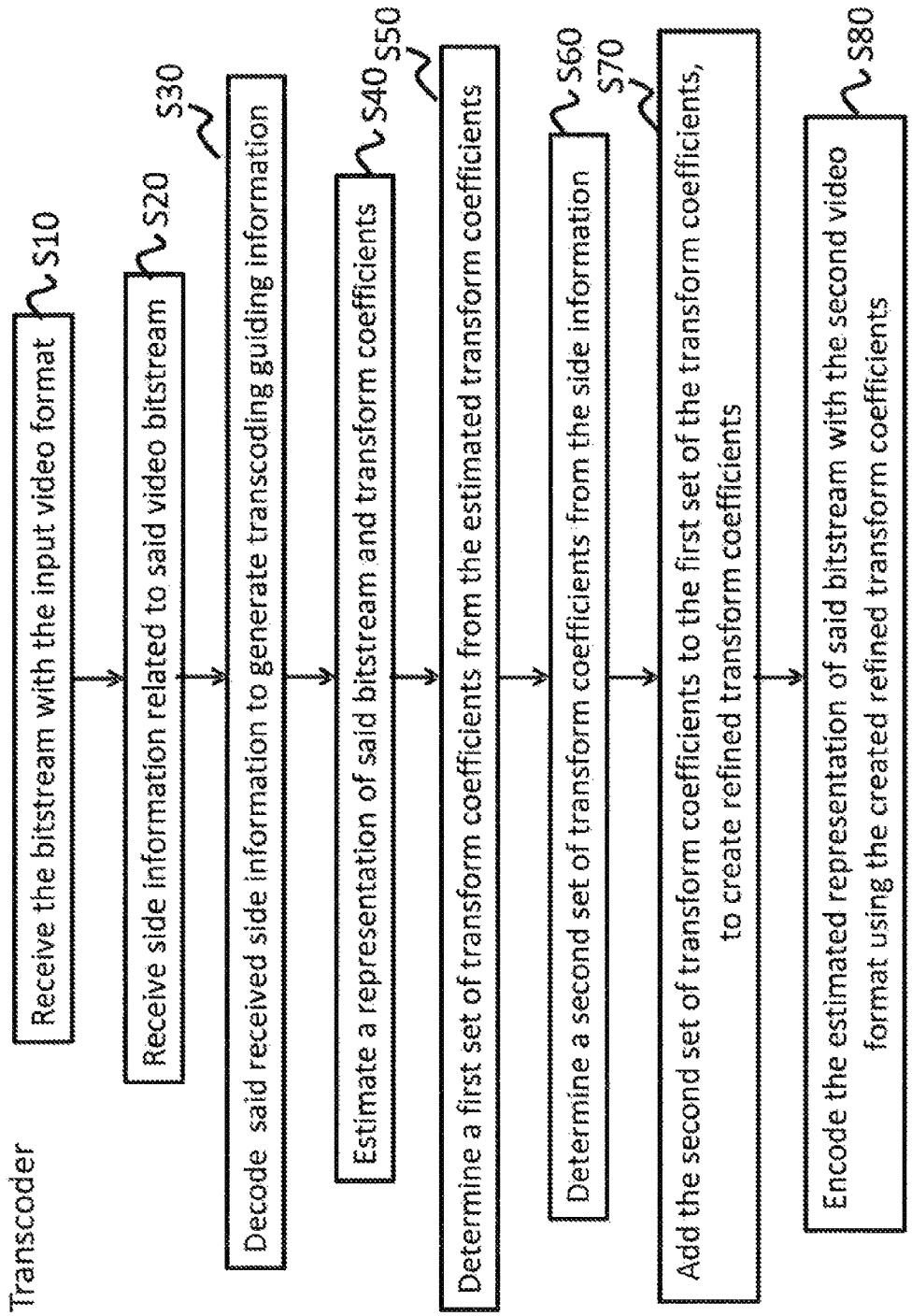
FIGS. 2-3 are flowcharts of the method for a transcoder according to one embodiment.

That is achieved by a method for a transcoder for transcoding a bitstream representing an original video source from an input video format to an output video format as illustrated in FIG. 1. The method is illustrated in FIG. 2 and comprises the steps of receiving S10 the bitstream with the input video format, wherein the input video format is a first format exemplified by a high fidelity format and the output format from the transcoding is a second format exemplified by a low fidelity format, and receiving S20 side information related to said video bitstream. Said side information comprising at least:

a video bitstream representing the original video source with a second format, coding parameters based on knowledge of the original video source; and transform coefficients, indicative of a residual between original transform coefficients and estimated transform coefficients. The original transform coefficients may be a residual between original video source and a prediction of the second video format and estimated transform coefficients may be a residual between a reconstruction of the first video format and inter/intra prediction using the second video format.

The method further comprises decoding S30 said received side information to generate transcoding guiding information, estimating S40 a representation of said received bitstream and transform coefficients with a low fidelity output format based on the received bit stream with high fidelity format and the generated transcoding guiding information, determining S50 a first set of transform coefficients from the estimated transform coefficients wherein the first set of the transform coefficients captures the main characteristics of the original transform coefficients, and determining S60 a second set of transform coefficients from the side information wherein the transform coefficients of the second set corresponds to same positioning within a transform block as the transform coefficients of the first set.

The main characteristics refer to resemblance of the original transform coefficient magnitudes.

The second set of transform coefficients are added S70 to the first set of the transform coefficients, to create refined transform coefficients that better captures the characteristics of the original transform coefficients than the estimated transform coefficients, and the estimated representation of said received bitstream with the low fidelity output format is encoded S80 using the created refined transform coefficients.

One reason for adding the second set of transform coefficients from the side information to the first set of transform coefficients, is that corresponding transform coefficients of the side information was derived by taking the difference between the second set of original transform coefficients and the first set of the estimated transform coefficients. Thus the addition can re-produce the original transform coefficients if the same sets of transform coefficients are used for the addition as when the difference was produced.

The embodiments suggest to control, by determining the first set of transform coefficients, how much of the estimated transform coefficients (at the transcoder), also referred to as re-generated transform coefficients, that should be used or which part of them that should be used for determining refined transform coefficients at the transcoder. If the difference between original transform coefficients (second set at encoder side) and the predicted transform coefficients (first set) typically have smaller magnitudes than the original transform coefficients it will cost less amount of bits to encode them than the original transform coefficients. One way to view this re-generation of the first set of transform coefficients is that a processing is applied to increase the resemblance between re-generated transform coefficients and the original transform coefficients. Which processing to apply could be indicated in the side information so that a transcoder could do same processing as the encoder that produced the side information and thus exactly re-produce the original transform coefficients.

Figure 3:
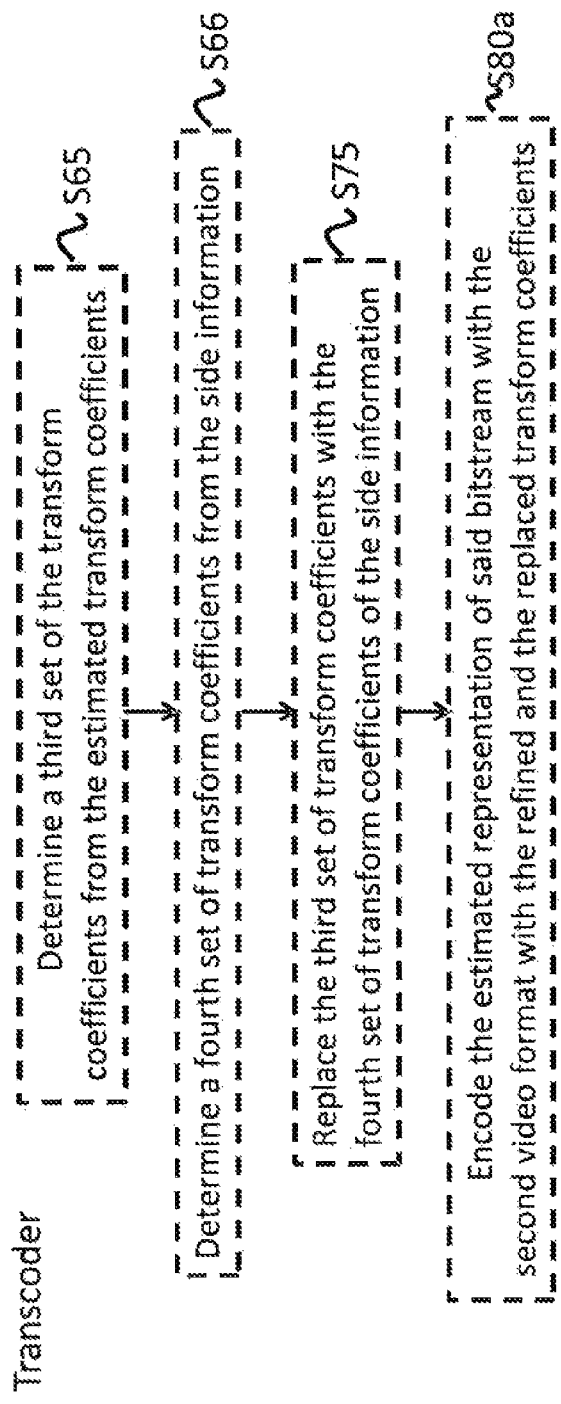

In accordance with a further embodiment as illustrated in FIG. 3, the method further comprises: determining S65 a third set of the transform coefficients from the estimated transform coefficients, wherein the third set captures transform coefficients that are more different from the original transform coefficients than the transform coefficients of the first set, and determining S66 a fourth set of transform coefficients from the side information, wherein the transform coefficients of the fourth set corresponds to same positioning within a transform block as the transform coefficients of the third set. The third set of transform coefficients are replaced S75 with the fourth set of transform coefficients of the side information, and the estimated representation of said bitstream with the low fidelity output format is encoded S80a with the refined and the replaced transform coefficients.

One can view the transform coefficients positioning in a matrix of the same size as the size of the transform. So when a transform to a block of samples is applied, the output are transform coefficients covering the same samples but in the frequency domain rather than spatial samples.

Thus according to the above described embodiment the third set of the estimated transform coefficients can be overwritten (i.e. replaced) by the fourth set of the original transform coefficients available in the side information and a first set of the transform coefficients can be refined by adding S70 the second set of transform coefficients to the first set of the transform coefficients. In this way, refined transform coefficients are created that better captures the characteristics of the original transform coefficients than the estimated transform coefficients.

According to further embodiments, the first set of transform coefficients is derived from the high fidelity format with a high quality, wherein high quality implies good resemblance between high fidelity format and the original source of the high fidelity format. In addition, the third set of transform coefficients may be derived from the high fidelity format with a low quality.

According to a yet further embodiment, the first set of transform coefficients is derived from the high fidelity format associated with lower frequencies. The third set of transform coefficients may be derived from the high fidelity format associated with higher frequencies.

Moreover, an indication may be sent from the encoder and received at the transcoder which is indicative how to derive the first set and the second set. The indication can be viewed as being part of the side information that guides the transcoder in how to derive a bitstream in the second format.

Another indication or the same indication may be sent from the encoder and received at the transcoder which is indicative how to derive the third set and the fourth set. The another indication can be viewed as being part of the side information that guides the transcoder in how to derive a bitstream in the second format.

Any of the indications can be signaled on VPS, SPS, PPS, slice header level or coding unit level, or transform block level or alternatively in an SEI message.

According to a further alternative it is possible to indicate in a specification or, as side information, in the bitstream how the transform coefficients should be divided in the different sets.

Naturally there will be a good correlation, i.e. good resemblance between the estimated transform coefficients that are derived from using a decoded version of a high fidelity format when the quality is high (low quantization parameter (QP)) as reference, after possibly down sampling to the resolution of the low fidelity format and the original transform coefficients that are derived by coding in the low fidelity format directly using the original source that was used to encode the high fidelity as input, after possibly down sampling the original source input to the resolution of the low fidelity format.

However for lower qualities (high QP) of the high fidelity format the re-generated coefficients will also consider resembling coding artifacts since it is based on a reference that contain coding artifacts and thus the correlation between the estimated transform coefficients and the original transform coefficients obtained from encoding directly in the low fidelity format will be less. Thus it can be beneficial to trust re-generated transform coefficients more if the quality of the high fidelity format is high (QP low). Typically larger transform coefficient magnitudes are likely due to a real change and not due to coding noise in the high fidelity format. Thus it can be beneficial to trust larger re-generated coefficient magnitudes more than smaller re-generated coefficient magnitudes, for example by only use prediction for re-generated transform coefficients with larger magnitudes.

Naturally it is also better correlation between the estimated low frequency transform coefficients and the original low frequency transform coefficients that are derived from directly encoding in a low fidelity format than the correlation between the transform coefficients considering higher frequencies. Thus it can be beneficial to trust low frequency estimated coefficients more than high frequency estimated coefficients, for example by only apply prediction for low frequency coefficients.

When there is good correlation (i.e. first set of transform coefficients capturing the main characteristics of the original transform coefficients) between the estimated transform coefficients and the original transform coefficients, the side information can be reduced significantly by using the estimated coefficients as prediction for the original transform coefficients and only encode the difference between the original transform coefficients and the estimated coefficients, e.g. coefficient prediction error, on the side information generation (encoder) side and on the transcoder side add back the prediction. When the correlation is less (third set of transform coefficients) the use of the prediction can increase the amount of side information to encode thus in this case it is better to not predict the original transform coefficients and thus instead replace the re-generated coefficients with the original transform coefficients available in the side information.

The different versions of sets of transform coefficients can be selected in various ways. One way is to perform the encoding for the difference between respective version of first set and second set and the indication of a version of the first set and second set, and select the version of the sets that consumes least bits. Another approach (approximative) is to determine the sum of magnitudes of difference transform coefficients for respective version of sets and select the sets that produces the smallest sum of magnitudes.

As mentioned above as illustrated in FIG. 8, the transcoder 820, receives from an encoder a video bitstream with a first video format 830, wherein the first video format may be a high fidelity format, and side information 840 related to said video bitstream. The side information 840 comprises at least:

a video bitstream 842 representing the original video source with a second video format e.g. a low fidelity video format, coding parameters 844 based on knowledge of the original video source; and transform coefficients 846, indicative of a residual between original transform coefficients and estimated transform coefficients.

Figure 4:
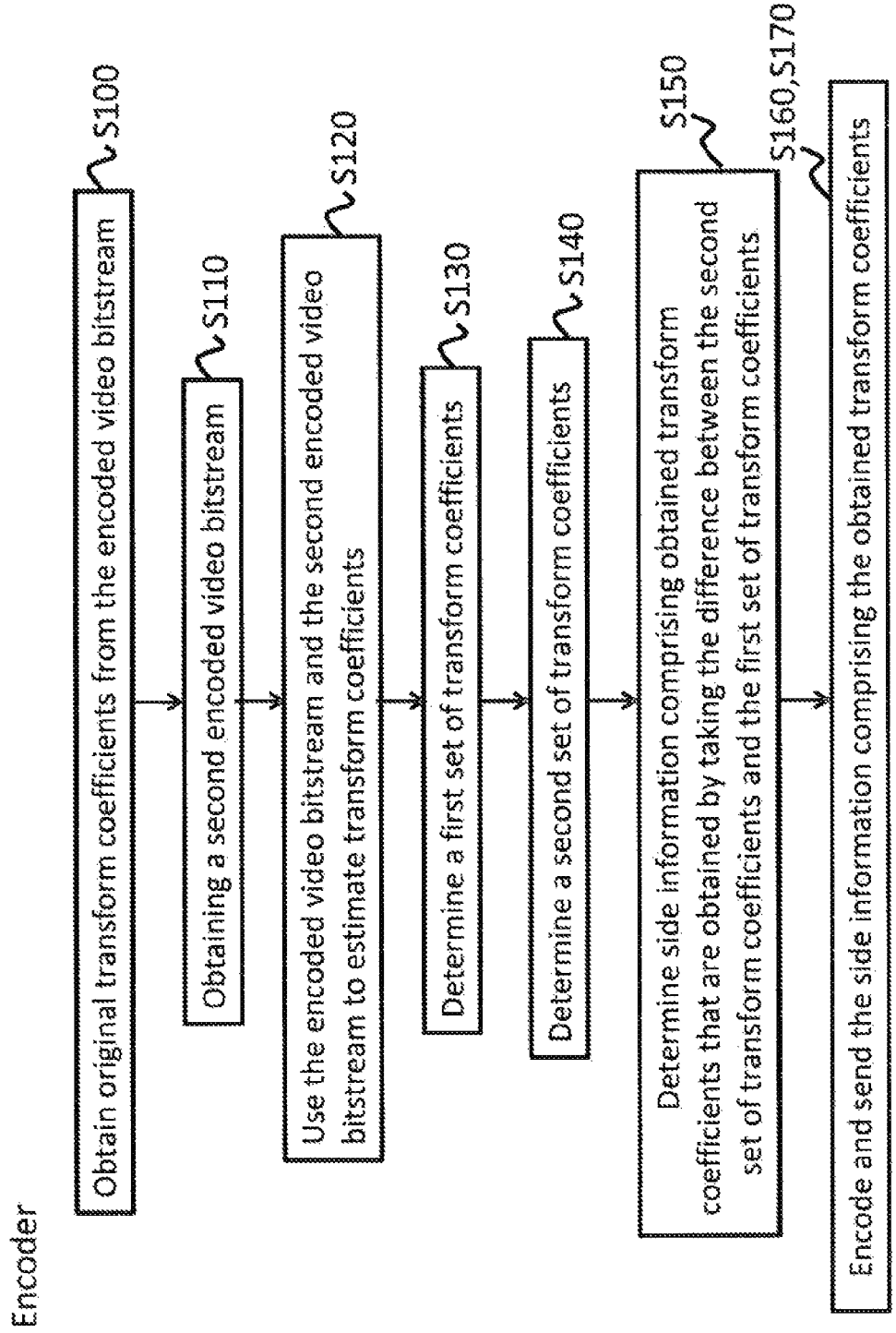
FIGS. 4-5 are flowcharts of the method for an encoder according to one embodiment.

The encoder provides said side information related to the encoded video bitstream. As illustrated in the flowchart of FIG. 4, the encoder determines the side information by:

Obtaining S100 original transform coefficients from the encoded video bitstream, where the encoded video bitstream represents an original video source with the second format (e.g. low fidelity format), Obtaining S110 a second encoded video bitstream, where the second encoded video bitstream represents an original video source with at least another format (e.g. high fidelity format) than the second format Using S120 the encoded video bitstream and the second encoded video bitstream to estimate transform coefficients, Determining S130 a first set of transform coefficients, wherein the first set of transform coefficients captures the main characteristics of the original transform coefficients, and Determining S140 a second set of transform coefficients from the second encoded video bitstream that corresponds to the same positioning within the transform as the transform coefficients of the first set of transform coefficients.

The side information is then determined S150 and the side information comprises obtained transform coefficients that are obtained by taking the difference between the second set of transform coefficients and the first set of transform coefficients. The side information is encoded S160 and sent S170 to the transcoder.

The first set of transform coefficients is preferably selected in order to minimize the amount of bits needed to encode the differential coefficients and the indication of the first and second set. The differential coefficients refer to the transform coefficients, indicative of a residual between original transform coefficients and estimated transform coefficients.

Figure 5:
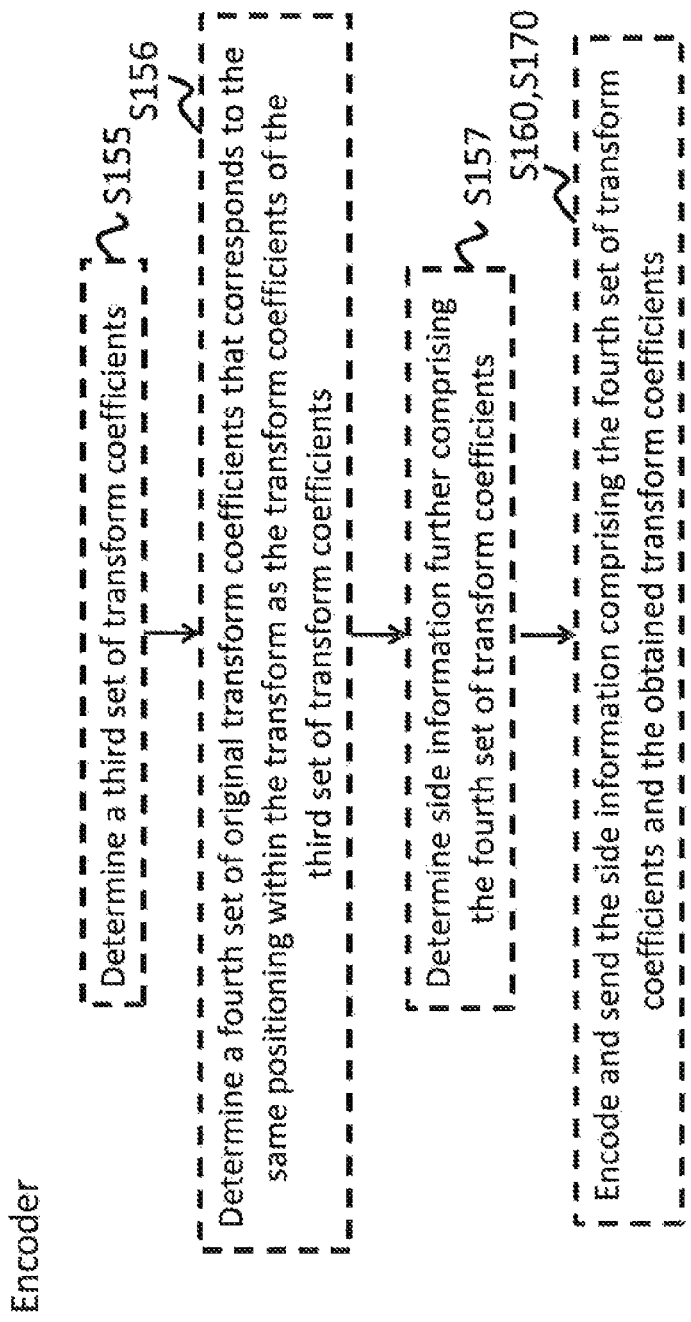

According to a further embodiment as illustrated in FIG. 5, a third set of transform coefficients, is determined S155 wherein the transform coefficients of the third set captures estimated transform coefficients that are more different from the original transform coefficients than the transform coefficients of the first set. A a fourth set of original transform coefficients is determined S156 that corresponds to the same positioning within the transform as the transform coefficients of the third set of transform coefficients, and side information is determined S157 further comprising the fourth set of transform coefficients.

The side information comprising the fourth set of transform coefficients and the obtained transform coefficients are encoded S160 and sent S170.

The first video format may be a high fidelity format and the second video format may be a low fidelity format.

Figure 6:
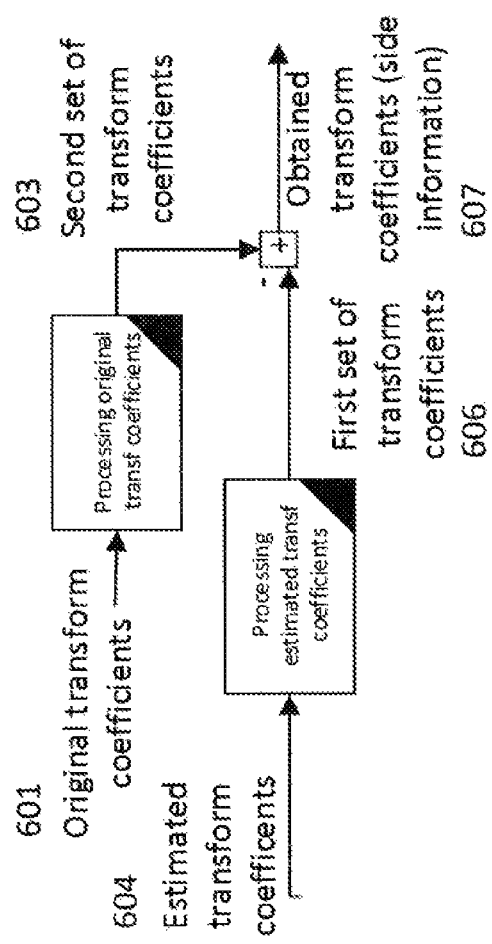
FIG. 6 illustrates schematically generation of differential transform coefficients for the side-information on the encoder side according to embodiments of the invention.

In FIG. 6, it is illustrated how the transform coefficients of the side information is determined in the encoder.

In the encoder, a representation of said bitstream and transform coefficients with a second video format is estimated 604 based on the received bit stream with first video format and the generated transcoding guiding information. A first set of transform coefficients 606 from the estimated transform coefficients 604 is determined, wherein the first set of the transform coefficients captures the main characteristics of the original transform coefficients.

Figure 7:
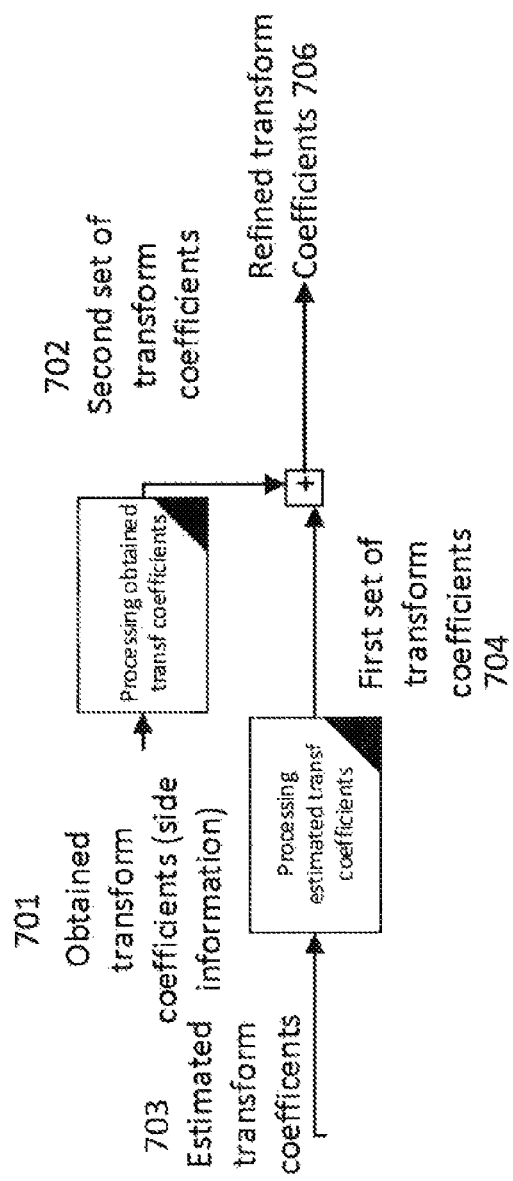
FIG. 7 illustrates schematically generation of original transform coefficients on the transcoder side according to embodiments of the present invention.

A second set of transform coefficients 603 from the original transform coefficients 601 in the side information is determined, wherein the transform coefficients of the second set corresponds to same positioning within a transform block as the transform coefficients of the first set.

add the second set of transform coefficients 603 to the first set of the transform coefficients 606, to create refined transform coefficients 607 that better captures the characteristics of the original transform coefficients than the estimated transform coefficients In FIG. 7, it is illustrated how the transform coefficients of the side information from the encoder is being used in the transcoder.

In the transcoder, a representation of said bitstream and transform coefficients 703 with a second video format are estimated based on the received bit stream with first video format and the generated transcoding guiding information and a first set of transform coefficients 704 are determined from the estimated transform coefficients wherein the first set of the transform coefficients captures the main characteristics of the original transform coefficients. A second set of transform coefficients 702 is determined from the transform coefficients 701 of the side information wherein the transform coefficients of the second set corresponds to same positioning within a transform block as the transform coefficients of the first set 704. The second set of transform coefficients 702 is added to the first set of the transform coefficients 704, to create refined transform coefficients 706 that better captures the characteristics of the original transform coefficients than the estimated transform coefficients.

Figure 8:
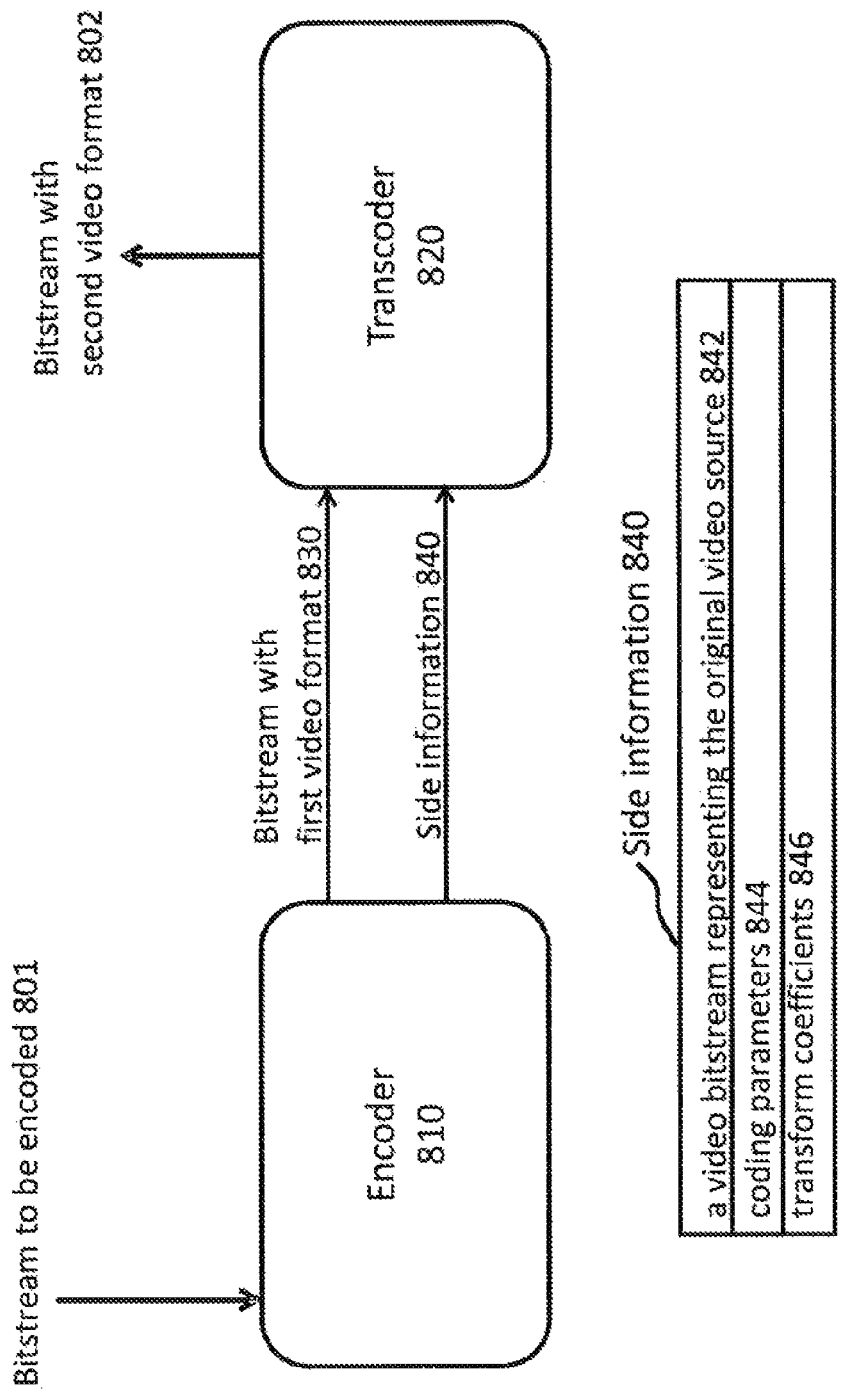
FIG. 8 illustrates an encoder and transcoder where side information is provided from the encoder to the transcoder according to embodiments of the present invention.

According to another aspect, a transcoder 820 for transcoding a bitstream representing an original video source from an input video format 830 to an output video format 802 is provided as illustrated in FIG. 8. The transcoder 820 is configured to:

receive the bitstream 830 with the input video format, wherein the input video format is a first video format;
receive side information 840 related to said video bitstream, said side information comprising at least:
a video bitstream 842 representing the original video source with a second video format,
coding parameters 844 based on knowledge of the original video source;
transform coefficients 846, indicative of a residual between original transform coefficients and;

decode said received side information 840 to generate transcoding guiding information,
estimate a representation of said received bitstream and transform coefficients with a second video format based on the received bit stream with first video format and the generated transcoding guiding information,
determine a first set of transform coefficients from the estimated transform coefficients wherein the first set of the transform coefficients captures the main characteristics of the original transform coefficients
determine a second set of transform coefficients from the side information wherein the transform coefficients of the second set corresponds to same positioning within a transform block as the transform coefficients of the first set,
add the second set of transform coefficients to the first set of the transform coefficients, to create refined transform coefficients that better captures the characteristics of the original transform coefficients than the estimated transform coefficients, and
encode the estimated representation of said bitstream with the second video format 802 using the created refined transform coefficients.

According to an embodiment, the transcoder is further configured to:
determine a third set of the transform coefficients from the estimated transform coefficients, wherein the third set captures transform coefficients that are more different from the original transform coefficients than the transform coefficients of the first set,
determine a fourth set of transform coefficients from the side information, wherein the transform coefficients of the fourth set corresponds to same positioning within a transform block as the transform coefficients of the third set,
replace the third set of transform coefficients with the fourth set of transform coefficients of the side information, and
encode the estimated representation of said received bitstream with the second video format with the refined and the replaced transform coefficients.

As stated above, the first video format may be a high fidelity format and the second video format may be a low fidelity format.

According to embodiments, the transcoder is further configured to derive the first set of transform coefficients from the high fidelity format with a high quality.

The transcoder may also be configured to derive the third set of transform coefficients from the high fidelity format with a low quality.

According to another embodiment, the transcoder may be configured to derive the first set of transform coefficients from the high fidelity format associated with lower frequencies. The transcoder may also be configured to derive the third set of transform coefficients from the high fidelity format associated with higher frequencies.

An encoder for providing transform coefficients in side information related to an encoded video bitstream, the encoder is configured to:
Obtain original transform coefficients from the encoded video bitstream, where the encoded video bitstream represents an original video source with a second video format,
Obtain a second encoded video bitstream, where the second encoded video bitstream represents an original video source with at least another format (e.g. the first video format) than the second video format Use the encoded video bitstream and the second encoded video bitstream to estimate transform coefficients, Determine a first set of transform coefficients, wherein the first set of transform coefficients captures the main characteristics of the original transform coefficients, Determine a second set of transform coefficients from the second encoded video bitstream that corresponds to the same positioning within the transform as the transform coefficients of the first set of transform coefficients, Determine side information comprising obtained transform coefficients that are obtained by taking the difference between the second set of transform coefficients and the first set of transform coefficients;

Encode and send the side information comprising the obtained transform coefficients.

The encoder of is according to an embodiment configured to determine a third set of transform coefficients, wherein the transform coefficients of the third set captures estimated transform coefficients that are more different from the original transform coefficients than the transform coefficients of the first set, determine a fourth set of original transform coefficients that corresponds to the same positioning within the transform as the transform coefficients of the third set of transform coefficients, determine side information further comprising the fourth set of transform coefficients, and to encode and send the side information comprising the fourth set of transform coefficients and the obtained transform coefficients.

According to an embodiment, the first video format is a high fidelity format and the second video format is a low fidelity format.

In accordance with another embodiment, the encoder is configured to derive the first set of transform coefficients from the high fidelity format with a high quality.

The encoder may be configured to derive the third set of transform coefficients from the high fidelity format with a low quality.

The encoder may also be configured to derive the first set of transform coefficients from the high fidelity format associated with lower frequencies and the encoder may be configured to derive the third set of transform coefficients from the high fidelity format associated with higher frequencies.

An indication may be sent from the encoder to be received at the transcoder which is indicative how to derive the estimated transform coefficients. The indication may specify which forward transform and forward quantization to use to derive the estimated transform coefficients. The indication may also specify which resampling method to use to derive the estimated transform coefficients. This indication may be part of the side information.

As described above the transform coefficients that are signaled in the side information from an encoder to a transcoder is generated by taking the difference between the original transform coefficients and the estimated transform coefficients. The estimated transform coefficients come from applying a forward transform on a residual block of samples as described above. The forward transform is typically the inverse of the inverse transform that a decoder uses, but not necessarily. Forward transform is basically conversion from spatial samples to samples in the frequency domain and the inverse transform is conversion from samples in frequency domain to samples in spatial domain. One example of forward transform is an integer DCT (integer version of discrete cosine transform). Those coefficients are then forward quantized. Forward quantization is typically more or less the inverse of the inverse quantization that a decoder uses. One example of forward quantization is to divide a value by a factor for example 5/2 is 2, e.g. 5 is quantized to 2. One example of inverse quantization is to multiply by the same factor 2*2 which is 4, e.g. 2 is inverse quantized to 4. If one signal \transmits an indication of which forward transform and forward quantization that was used to produce the estimated coefficients on the encoder side (side information generation) the transcoder receive that indication and can then use the same method to derive exactly the same estimated transform coefficients. This enables the transcoder to re-produce the original transform coefficients exactly.

Example of a forward quantization scheme is RDOQ (Rate Distorsion Optimized Quantization) which is a method to do the forward quantization adaptively to enable bit savings in encoding the transform coefficients.

If the resolution of the video format that is decoded to produce reconstructed samples is different from the video format than the side information is generated for, the encoder will do a resampling of the reconstructed samples to resolution of the video format of the intended side information before estimating the transform coefficients. The transcoder side also needs to do a resampling. If a signal indicating which resampling that was used is signaled from the encoder side that generates the side information and a transcoder receives it the transcoder can perform the same resampling and thus derive the same estimated transform coefficients. This together with same forward transform and forward quantization enables the transcoder to re-produce the original transform coefficients exactly. The information about the resampling may be part of the side information.

Figure 9:
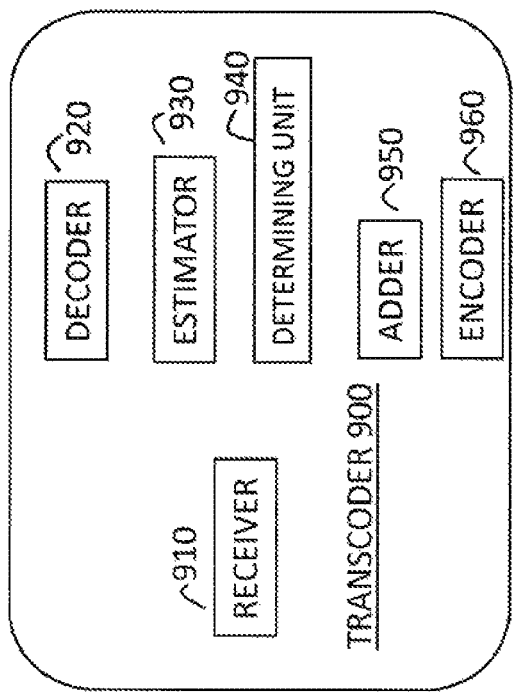
FIGS. 9 and 12 illustrate schematically a transcoder according to one embodiment.

According to a further aspect as schematically illustrated in FIG. 9, a transcoder 900 (also referred to as 820) for transcoding a bitstream representing an original video source from an input video format to an output video format is provided. The transcoder comprises a receiver 910 for receiving the bitstream with the input video format, wherein the input video format is a first video format and for receiving side information related to said video bitstream. Said side information comprising at least:

a video bitstream representing the original video source with a second video format, coding parameters based on knowledge of the original video source; and transform coefficients, indicative of a residual between original transform coefficients and estimated transform coefficients.

The transcoder further comprises a decoder 920 for decoding said received side information to generate transcoding guiding information, an estimator 930 for estimating a representation of said received bitstream and transform coefficients with a second video format based on the received bit stream with first video format and the generated transcoding guiding information, a determining unit 940 for determining a first set of transform coefficients from the estimated transform coefficients wherein the first set of the transform coefficients captures the main characteristics of the original transform coefficients and for determining a second set of transform coefficients from the side information wherein the transform coefficients of the second set correspond to same positioning within a transform block as the transform coefficients of the first set, an adder 950 for adding the second set of transform coefficients to the first set of the transform coefficients, to create refined transform coefficients that better captures the characteristics of the original transform coefficients than the estimated transform coefficients, and an encoder 960 for encoding the estimated representation of said received bitstream with the second video format using the created refined transform coefficients.

Figure 10:
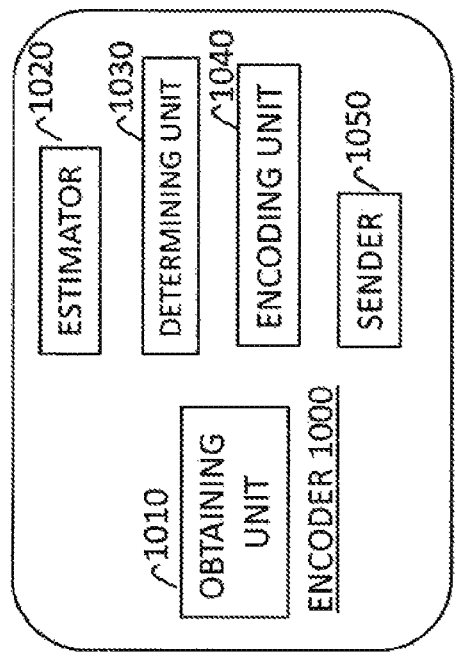
FIG. 10-11 illustrate schematically an encoder according to one embodiment.

According to a further aspect, as schematically illustrated in FIG. 10, an encoder 1000 (also referred to as 810) for providing transform coefficients in side information related to an encoded video bitstream is provided. The encoder comprises an obtaining unit 1010 for obtaining original transform coefficients from the encoded video bitstream, where the encoded video bitstream represents an original video source with a second video format, and for obtaining a second encoded video bitstream, where the second encoded video bitstream represents an original video source with at least another format than the second video format. The encoder 1000 further comprises an estimator 1020 for using the encoded video bitstream and the second encoded video bitstream to estimate transform coefficients and a determining unit 1030 for determining a first set of transform coefficients, wherein the first set of transform coefficients captures the main characteristics of the original transform coefficients, for determining a second set of transform coefficients from the second encoded video bitstream that corresponds to the same positioning within the transform as the transform coefficients of the first set of transform coefficients, and for determine side information comprising obtained transform coefficients that are obtained by taking the difference between the second set of transform coefficients and the first set of transform coefficients. The encoder further comprises an encoding unit 1040 for encoding and a sender 1050 for sending the side information comprising the obtained transform coefficients.

Figure 11:
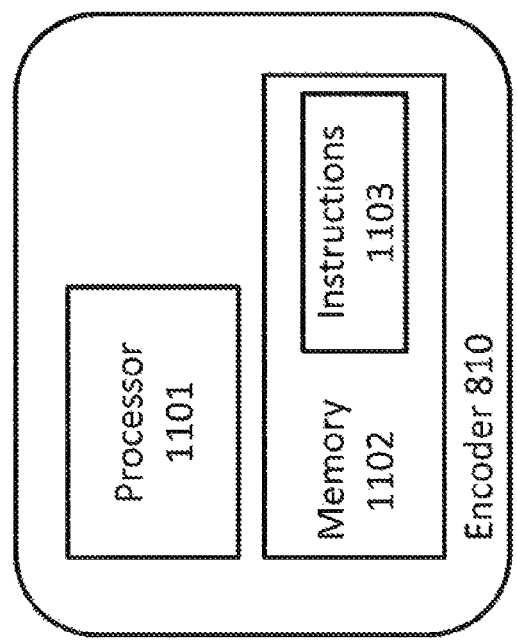

According to a further aspect an encoder for providing transform coefficients in side information related to an encoded video bitstream is provided as illustrated in FIG. 11. The encoder comprises: a processor 1101; and a memory 1102 comprising instructions executable by said processor 1101, wherein said processor 1101 is operative to Obtain original transform coefficients from the encoded video bitstream, where the encoded video bitstream represents an original video source with a second video format, Obtain a second encoded video bitstream, where the second encoded video bitstream represents an original video source with at least another format than the second video format Use the encoded video bitstream and the second encoded video bitstream to estimate transform coefficients, Determine a first set of transform coefficients, wherein the first set of transform coefficients captures the main characteristics of the original transform coefficients, Determine a second set of transform coefficients from the second encoded video bitstream that corresponds to the same positioning within the transform as the transform coefficients of the first set of transform coefficients, Determine side information comprising obtained transform coefficients that are obtained by taking the difference between the second set of transform coefficients and the first set of transform coefficients;

Encode and send the side information comprising the obtained transform coefficients.

Figure 12:
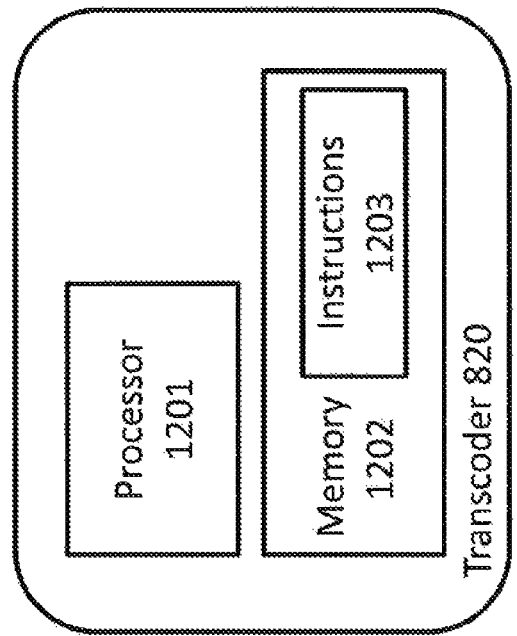

According to a further aspect, as illustrated in FIG. 12, a transcoder 820 for transcoding a bitstream representing an original video source from an input video format to an output video format is provided. The transcoder comprises: a processor 1201; and a memory 1202 comprising instructions 1203 executable by said processor 1201. Said processor 1201 is operative to receive the bitstream with the input video format, wherein the input video format is a first video format;

receive side information related to said video bitstream, said side information comprising at least:

a video bitstream representing the original video source with a second video format, coding parameters based on knowledge of the original video source;

transform coefficients, indicative of a residual between original transform coefficients and estimated transform coefficients;

decode said received side information to generate transcoding guiding information, estimate a representation of said bitstream and transform coefficients with a second video format based on the received bit stream with first video format and the generated transcoding guiding information, determine a first set of transform coefficients from the estimated transform coefficients wherein the first set of the transform coefficients captures the main characteristics of the original transform coefficients determine a second set of transform coefficients from the side information wherein the transform coefficients of the second set corresponds to same positioning within a transform block as the transform coefficients of the first set, add the second set of transform coefficients to the first set of the transform coefficients, to create refined transform coefficients that better captures the characteristics of the original transform coefficients than the estimated transform coefficients, and encode the estimated representation of said received bitstream with the second video format using the created refined transform coefficients.

Figure 13:
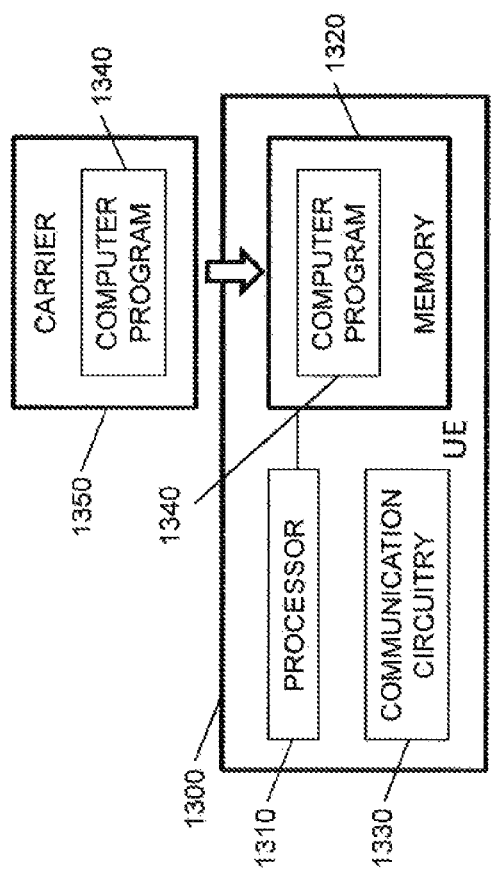
FIG. 13 illustrates a UE according to one embodiment.

A computer program 1340 is also provided as illustrated in FIG. 13 which comprises instructions, which when executed by a processor 1310, cause said processor 1310 to:

receive the bitstream with the input video format, wherein the input video format is a first video format;

receive side information related to said video bitstream, said side information comprising at least:

a video bitstream representing the original video source with a second video format, coding parameters based on knowledge of the original video source;

transform coefficients, indicative of a residual between original transform coefficients and estimated transform coefficients;

decode said received side information to generate transcoding guiding information, estimate a representation of said bitstream and transform coefficients with a second video format based on the received bit stream with first video format and the generated transcoding guiding information, determine a first set of transform coefficients from the estimated transform coefficients wherein the first set of the transform coefficients captures the main characteristics of the original transform coefficients determine a second set of transform coefficients from the side information wherein the transform coefficients of the second set corresponds to same positioning within a transform block as the transform coefficients of the first set, add the second set of transform coefficients to the first set of the transform coefficients, to create refined transform coefficients that better captures the characteristics of the original transform coefficients than the estimated transform coefficients, and encode the estimated representation of said received bitstream with the second video format using the created refined transform coefficients.

A further computer program 1340 is also provided. The computer program 1340 comprises instructions, which when executed by a processor 1310, cause said processor 1310 to:

Obtain original transform coefficients from the encoded video bitstream, where the encoded video bitstream represents an original video source with a second video format, Obtain a second encoded video bitstream, where the second encoded video bitstream represents an original video source with at least another format than the second video format Use the encoded video bitstream and the second encoded video bitstream to estimate transform coefficients, Determine a first set of transform coefficients, wherein the first set of transform coefficients captures the main characteristics of the original transform coefficients, Determine a second set of transform coefficients from the second encoded video bitstream that corresponds to the same positioning within the transform as the transform coefficients of the first set of transform coefficients, Determine side information comprising obtained transform coefficients that are obtained by taking the difference between the second set of transform coefficients and the first set of transform coefficients;

Encode and send the side information comprising the obtained transform coefficients.

The proposed technology also provides a carrier 1350 comprising the computer program 1340. The carrier 1350 is one of an electronic signal, an optical signal, an electromagnetic signal, a magnetic signal, an electric signal, a radio signal, a microwave signal, or a computer-readable storage medium 1350.

By way of example, the software or computer program 1340 may be realized as a computer program product, which is normally carried or stored on a computer-readable medium 1340, preferably non-volatile computer-readable storage medium 1320. The computer-readable medium 1320 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 1340 may thus be loaded into the operating memory of a computer or equivalent processing device, exemplified by a user equipment (UE) 1300 for execution by the processor 1310 thereof. The UE 1300 typically also comprises communication circuitry.

The examples above describe transcoding from a high fidelity format to a low fidelity format with help of low fidelity side information and on the encoder side also produce side information for the low fidelity format. An alternative implementation is to do transcoding from a low fidelity format to a high fidelity format with help of high fidelity side information and also on the encoder side produce side information for the high fidelity format.

A user equipment may also be provided which comprises the encoder as described above, wherein said user equipment is selected from a group comprising a computer, a laptop, a smart phone, a tablet and a set-top box, etc.

A network node may also be provided which comprises the transcoder as described above.

The invention claimed is:

1. A method for a transcoder for transcoding a bitstream representing an original video source from an input video format to an output video format, comprising, the method comprising:
    receiving the bitstream with the input video format, wherein the input video format is a first video format; and
    receiving side information related to said video bitstream, said side information comprising at least:
        a video bitstream representing the original video source with a second video format,
        coding parameters based on knowledge of the original video source, and
        transform coefficients, indicative of a residual between original transform coefficients and estimated transform coefficients;
    the method further comprising:
    decoding said received side information to generate transcoding guiding information;
    estimating a representation of said received bitstream and transform coefficients with a second video format based on the received bit stream with first video format and the generated transcoding guiding information;
    determining a first set of transform coefficients from the estimated transform coefficients wherein the first set of the transform coefficients captures the main characteristics of the original transform coefficients;
    determining a second set of transform coefficients from the side information wherein the transform coefficients of the second set corresponds to same positioning within a transform block as the transform coefficients of the first set;
    adding the second set of transform coefficients to the first set of the transform coefficients, to create refined transform coefficients that better captures the characteristics of the original transform coefficients than the estimated transform coefficients; and
    encoding the estimated representation of said received bitstream with the second video format using the created refined transform coefficients.

2. The method of claim 1, wherein the first video format is a high fidelity format and the second video format is a low fidelity format.

3. The method of claim 2, wherein the first set of transform coefficients is derived from the high fidelity format with a high quality.

4. The method of claim 2, wherein the first set of transform coefficients is derived from the high fidelity format associated with lower frequencies.

5. The method of claim 1, further comprising:
    determining a third set of the transform coefficients from the estimated transform coefficients, wherein the third set captures transform coefficients that are more different from the original transform coefficients than the transform coefficients of the first set;
    determining a fourth set of transform coefficients from the side information, wherein the transform coefficients of the fourth set corresponds to same positioning within a transform block as the transform coefficients of the third set;
    replacing the third set of transform coefficients with the fourth set of transform coefficients of the side information; and
    encoding the estimated representation of said received bitstream with the second video format with the refined and the replaced transform coefficients.

6. The method of claim 5, wherein the first video format is a high fidelity format and the second video format is a low fidelity format.

7. The method of claim 6, wherein the third set of transform coefficients is derived from the high fidelity format with a low quality.

8. The method of claim 6 wherein the third set of transform coefficients is derived from the high fidelity format associated with higher frequencies.

9. A method for an encoder for providing transform coefficients in side information related to an encoded video bitstream, the method comprising:
- obtaining original transform coefficients from the encoded video bitstream, where the encoded video bitstream represents an original video source with a second video format;
- obtaining a second encoded video bitstream, where the second encoded video bitstream represents an original video source with at least another format than the second video format;
- using the encoded video bitstream and the second encoded video bitstream to estimate transform coefficients;
- determining a first set of transform coefficients, wherein the first set of transform coefficients captures the main characteristics of the original transform coefficients;
- determining a second set of transform coefficients from the second encoded video bitstream that corresponds to the same positioning within the transform as the transform coefficients of the first set of transform coefficients;
- determining side information comprising obtained transform coefficients that are obtained by taking the difference between the second set of transform coefficients and the first set of transform coefficients; and
- encoding and sending the side information comprising the obtained transform coefficients.

10. The method of claim 9, wherein the first video format is a high fidelity format and the second video format is a low fidelity format.

11. The method of claim 10, wherein the first set of transform coefficients is derived from the high fidelity format with a high quality.

12. The method of claim 10, wherein the first set of transform coefficients is derived from the high fidelity format associated with lower frequencies.

13. The method of claim 9, further comprising:
- determining a third set of transform coefficients, wherein the transform coefficients of the third set captures estimated transform coefficients that are more different from the original transform coefficients than the transform coefficients of the first set;
- determining a fourth set of original transform coefficients that corresponds to the same positioning within the transform as the transform coefficients of the third set of transform coefficients;
- determining side information further comprising the fourth set of transform coefficients; and
- encoding and sending the side information comprising the fourth set of transform coefficients and the obtained transform coefficients.

14. The method of claim 13, wherein the first video format is a high fidelity format and the second video format is a low fidelity format.

15. The method of claim 14, wherein the third set of transform coefficients is derived from the high fidelity format with a low quality.

16. The method of claim 14, wherein the third set of transform coefficients is derived from the high fidelity format associated with higher frequencies.

\* \* \* \* \*